Figure 1:
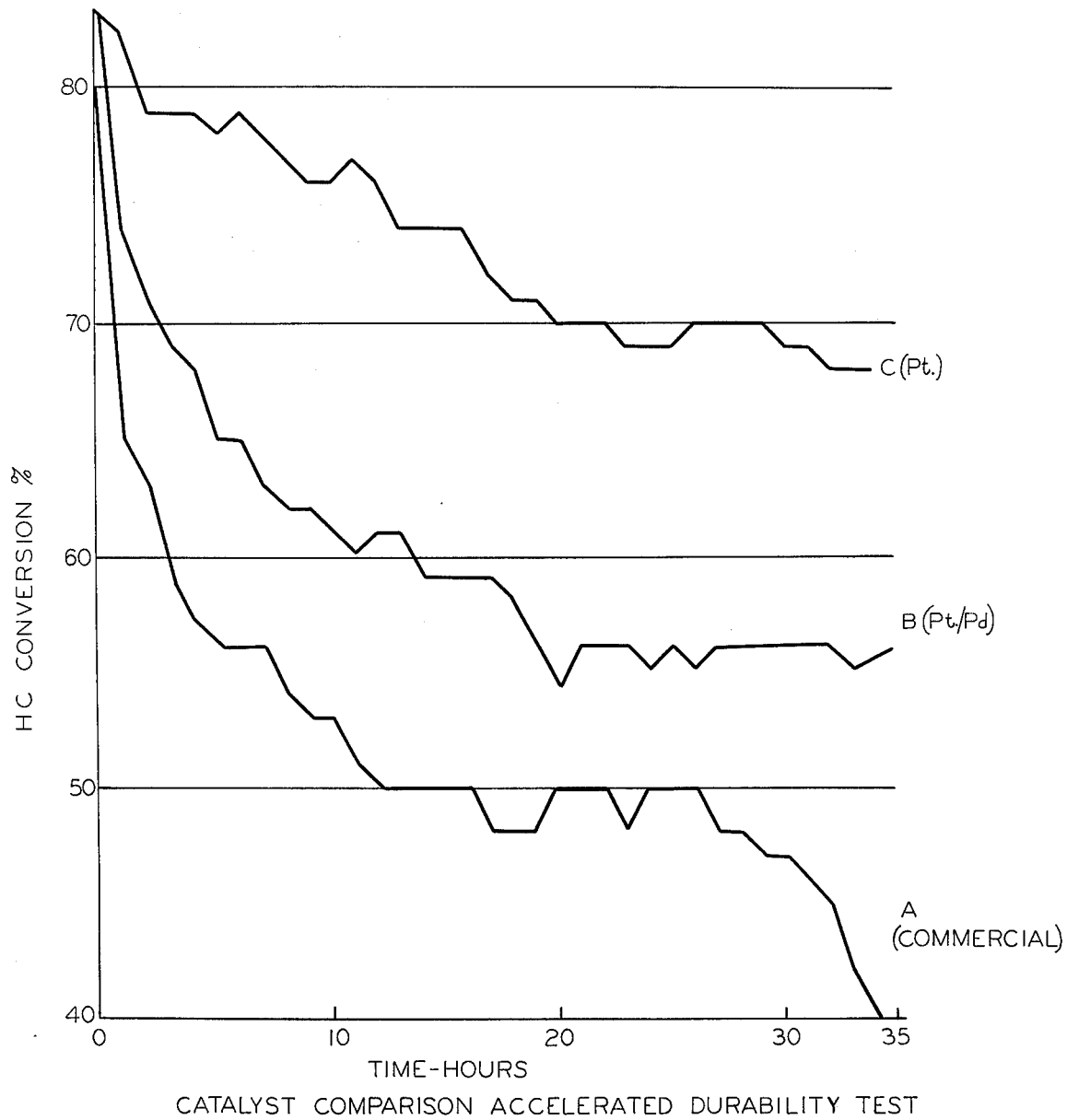

United States Patent [19]
Hegedus et al.

[11] 4,119,571
[45] * Oct. 10, 1978

[54] PELLET TYPE OXIDATION CATALYST

[75] Inventors: Louis Hegedus, Grosse Pointe Woods; Jack C. Summers, Rochester, both of Mich.

[73] Assignee: General Motors Corporation, Detroit, Mich.

[ * ] Notice: The portion of the term of this patent subsequent to Sep. 27, 1994, has been disclaimed.

[21] Appl. No.: 815,791

[22] Filed: Jul. 15, 1977

Related U.S. Application Data

[63] Continuation-in-part of Ser. No. 658,031, Feb. 13, 1976, Pat. No. 4,051,073.

[51] Int. Cl.$^2$ .................. B01J 21/04; B01J 23/42; B01J 23/44
[52] U.S. Cl. ............................ 252/466 PT; 423/213.5
[58] Field of Search ............... 252/466 PT; 423/213.5

[56] References Cited

U.S. PATENT DOCUMENTS

| | | | |
|---|---|---|---|
| 3,565,830 | 2/1971 | Keith et al. | 252/466 PT |
| 3,928,237 | 12/1975 | Davis | 252/466 PT |

*Primary Examiner*—W. J. Shine
*Attorney, Agent, or Firm*—Sidney Carter

[57] ABSTRACT

This invention relates to oxidation catalysts wherein the catalytically active metallic material has an impregnation depth of at least 90 microns up to about 250 microns on the porous support which has a surface area of at least 100 m$^2$/g. up to about 250 m$^2$/g. and a pore structure characterized by a macropore volume of at least 0.020 cm$^3$/g. and a macropore radius greater than about 10,000 A°, the maximum value for macropore volume being that at which the catalyst is unable to sustain the load and vibration forces to which it is subjected in the converter.

7 Claims, 5 Drawing Figures

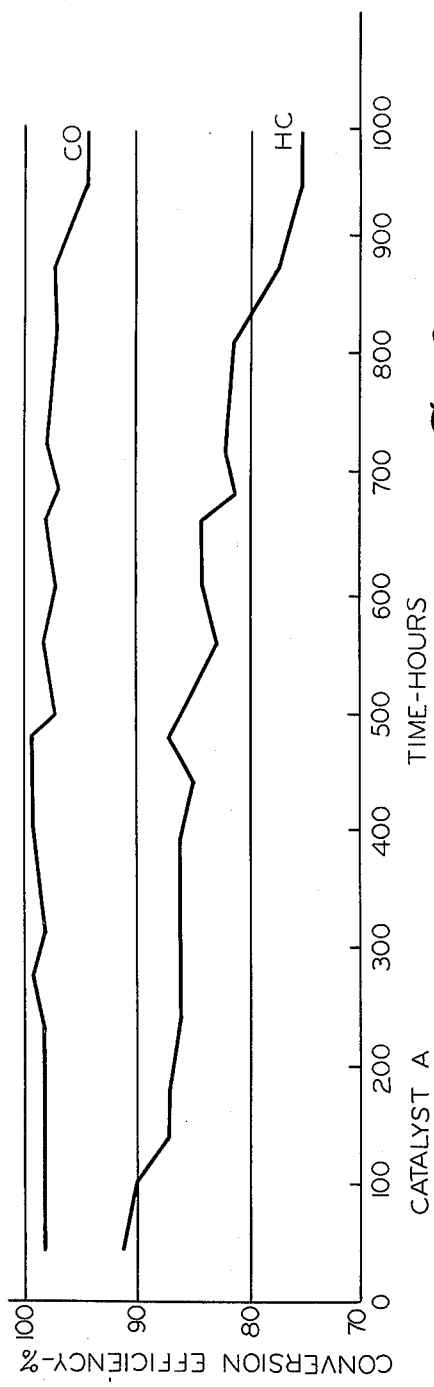
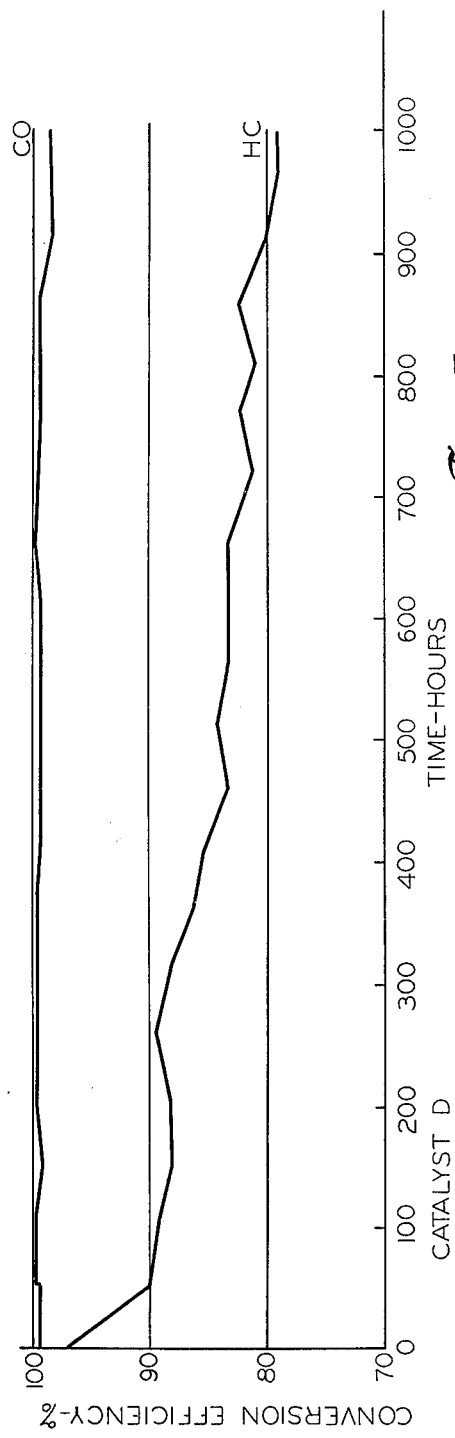

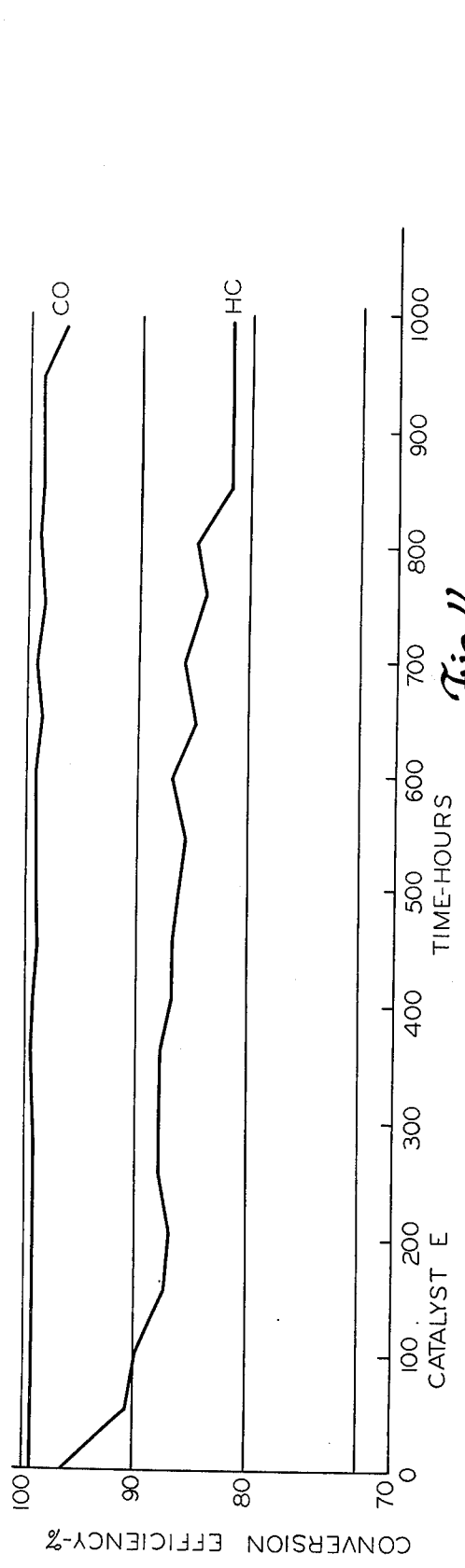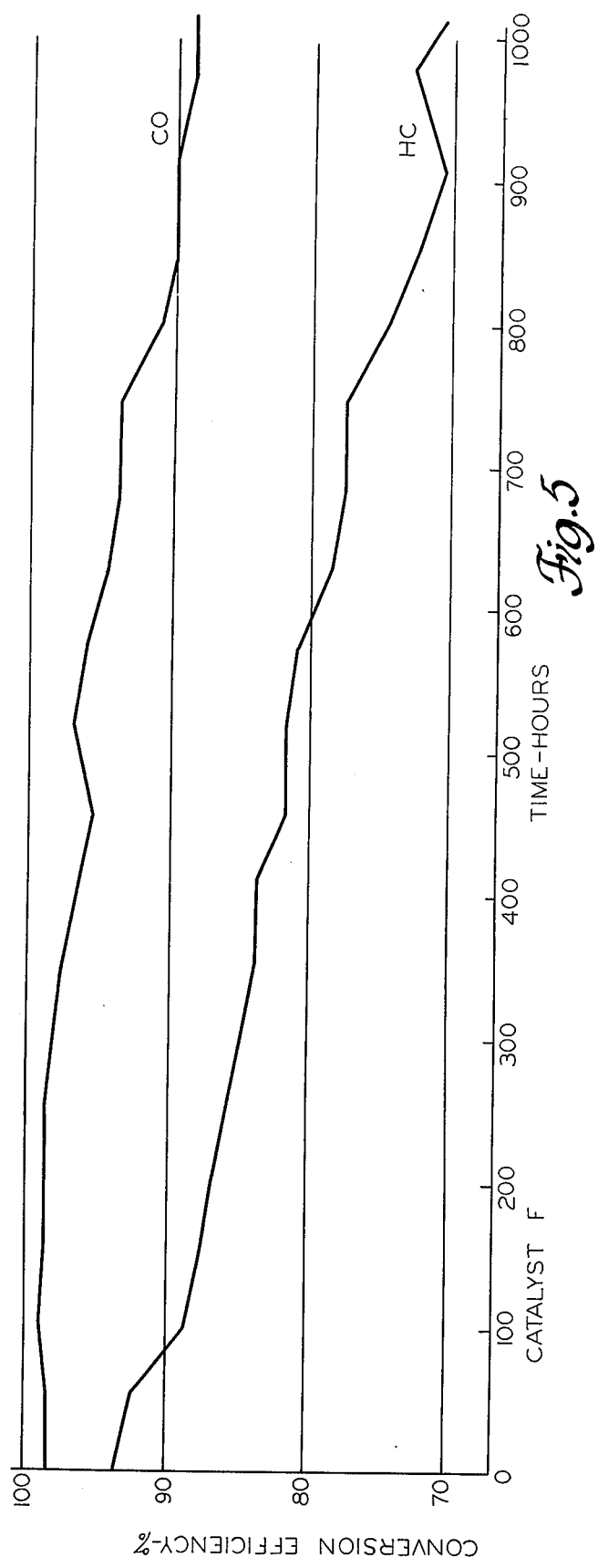

PELLET TYPE OXIDATION CATALYST

This invention is a continuation-in-part of Applicants' copending application Ser. No. 658,031 filed Feb. 13, 1976, now U.S. Pat. No. 4,051,073 and relates to improved oxidation catalysts of the pellet type having higher catalytic performance over its required lifetime in the operating environment which includes precursor compounds of lead and phosphorus which are known catalyst poisons.

More particularly, the catalyst of our invention is intended to oxidize the unburned hydrocarbon and carbon monoxide in vehicle emissions. Numerous catalysts have been proposed and are known for oxidizing the unburned constituents in vehicle exhaust gas and, in fact, devices of both the particulate and monolith type are today in use on motor vehicles for the purpose of cleaning up the exhaust to levels required by Federal and State standards. However, as standards require lower levels of unburned hydrocarbons, a greater demand is placed on the known catalysts for higher conversion efficiencies while still remaining effective over a lifespan as long as 50,000 miles and beyond.

Applicants have conducted extensive theoretical and laboratory studies, with results verified by engine dynamometer real time testing, and have developed an improved catalyst as compared to known catalysts wherein a larger macroporous volume and radius is provided for higher diffusivity of the exhaust gas in the catalyst with resultant higher catalytic activity (and also more rapid poisoning of the catalyst), and having a larger surface area to slow down the rate of poison penetration. Penetration of the support by the catalytically active metallic material is provided to a greater depth in order to achieve the catalyst lifetime required.

As noted, catalysts having oxidizing capability are well known in the prior art and such catalysts include those having special physical structure. U.S. Pat. No. 3,907,512 issued Sept. 23, 1975 to Ziegenhain et al discloses an alumina product having a pore volume greater than about 1.0 cc/g. and a surface area greater than about 275 m$^2$/g. and having a macropore diameter of from 0 to 10,000 A°, the patentee noting that larger diameter macropore material has little value for catalytic purposes. U.S. Pat. Nos. 3,388,077 and 3,259,589 issued to Hoekstra on June 11, 1968 and to Michalko on July 5, 1966, respectively, disclose catalyst for treatment of combustible waste gas wherein an organic acid such as citric acid is used in controlled amounts with the solution of metallic catalytic material in order to produce a finite zone of the catalytic material either on or within the surface of the alumina support. The patentee however does not teach any pore size characteristics, surface area or depth of penetration of the catalytic material.

It is recognized in the art that the bulk of catalyst activity is lost due to lead and phosphorus poisoning. On the basis of extensive laboratory testing and analysis we have found that the poison penetrates the pellet in a sharp front indicating that the rate of poisoning reaction is much faster than the rate of diffusion of the phosphorus and lead containing poison precursors into the pellet. It was also found that the rate of poison penetration increases with increasing diffusivity and decreases with increasing surface area of the pellet support. Likewise, it was determined that the diffusivity of the reactants and poison precursors increases with increasing macroporous volume and radius. Finally, the impregnation depth of the catalytically active materials was identified as important to the lifetime of the catalyst in that the penetrating poison front should not reach the end of the impregnated zone of the support before obtaining the required operating lifetime of the catalyst.

Accordingly, our invention comprises the characterization of support pore structure and surface area, as well as the depth of penetration of the catalytically active material in the support in order to achieve the required catalyst performance and durability.

In order to establish a common understanding as to the results achieved by our invention and as to the parameters defining the improved catalyst of our invention, the following information describes the testing techniques used.

Support surface area is measured by the $N_2$ adsorption BET technique which is well known in the art.

The penetration of the support pellet by the catalytically active materials is determined by microscopic examination of a cross-section of the catalyst against a micron scale. In the case of noble metal materials, the catalyst is treated in a boiling solution of $SnCl_2$ which turns the catalytic material black for good visualization. In the case of base metal and metal oxide catalysts other techniques for impregnation depth measurement are known in the art such as the electron microprobe.

The support pore structure, pore radius and pore volume, is readily determined by the mercury penetration technique using pressures up to and over 60,000 psig, this being well known in the art as mercury porosimetry. In our program, tests were made on an Aminco Porosimeter with the results plotted to show the cumulative volume of mercury penetration per gram of sample on the vertical axis, the porosimeter pressure being shown on the horizontal axis on a logarithmic scale. In this regard, two types of catalytic support are typically in use in automotive applications, namely, bimodal and monomodal supports. Bimodal supports have two types of pores, micropores and macropores. The porosimeter curve for the bimodal support shows two steps. The inflection point between the ends of the first step starting from the origin of the curve represents the breakpoint between the macropores and the micropores in the support, the portion of the curve to the left of the inflection point representing the macropore structure, that to the right representing the micropore structure. The pore radius for the two types of pores can be directly calculated from the pressure applied in the test for any given pressure. The cumulative macro and micropore volumes in cc/g. may be read directly from the curve. The pore radius and volume information is then used to calculate the integral average values for the pore radii. The integral averaging for the macropores proceeds from 0 to the macropore volume as discussed above while that for the micropores proceeds from the macropore volume to the total volume. The details of the test and of curve analysis and calculations are fully set forth in, among others, "*Chemical Engineering Kinetics*" by J. M. Smith, McGraw-Hill Publishing Company, New York, Second Edition, 1970.

Real-time engine dynamometer aging of catalysts is accomplished on a 350 CID engine having a 4 barrel carburetor and having a water brake, operating at an average speed of 50.5 mph to approximate the vehicle driving schedule obtained in complying with the Federal Appendix "D" Schedule consisting of 11 3.7 mile laps of stop-and-go driving with lap speeds varying from 30 to 70 mph, cycles being repeated for 50,000 miles. This is described in greater detail as the "Simulated Federal Schedule" in *Society of Automotive Engineers* (SAE) paper #730558, titled "Engine Dynamometers for the Testing of Catalytic Converter Durability" given at the SAE meeting in Detroit, Mich. May 14-18, 1973. The catalyst tested was loaded into a standard 260 cubic inch underfloor converter and the engine was run on a commercial type lead-free fuel having approximately 10 mg. Pb/l. and 0.5 mg. P/l. Periodic testing of the inlet and outlet gas streams at the converter, as well as of many other parameters of interest, is made during the course of the 1000 hour test to monitor converter performance. The details of these tests are set forth in SAE paper #730557, titled "An Engine Dynamometer System for the Measurement of Converter Performance" given at the above noted meeting.

Accelerated durability testing was performed using a 350 CID, 4 barrel carburetor, engine dynamometer at steady state high temperature conditions (566° C. bed inlet temperature), the catalyst being loaded into a 1000 cubic centimeter converter with the engine being run on a fuel containing 105 mg. Pb/l. and 5 mg. P/l., experiments having shown that 35 hours exposure to this fuel exhaust in the 1000 cm$^3$ converter results in poison concentrations and distributions similar to the effects of 50,000 miles exposure to lead-free fuel as described above for the Simulated Federal Schedule.

In determining the crush numbers a representative sample of the catalyst was taken, each of 10 pellets being subjected to a crushing force in pounds between two flat plates, the load at failure being the number for each pellet and the crush number shown being the average for the 10 pellets.

Shown in TABLE I is a comparison of the physical properties measured for four different catalysts made in accordance with our invention as compared with those measured for two typical commercial catalysts. The comparative performance of catalytic action for certain of the catalysts is shown in accelerated durability curves of FIG. 1 and in the 1,000 hour real-life charts shown in FIGS. 2-5. The catalysts having Pt/Pd are used in the ratio of 5:2 = Pt:Pd and in a total amount of approximately 0.05 troy oz./260 cubic inch converter, the same total applying to catalyst C, platinum only.

be noted that the hydrocarbon conversion is significantly higher for the catalysts of our invention, B and C, than that for the commercial type catalyst A.

A comparison of the characteristics of catalysts B and C with those of catalyst A shows that the catalysts of our invention have larger macropore radius and volume values which, in accordance with our theory, cause increased diffusivity of the reactants in the catalyst pellet. This also causes an increase in the diffusivity of the lead and phosphorus precursors which is, however, compensated for by the larger surface area of the improved catalysts. With regard to the earlier breakthrough of the reactants in catalyst A, note its thinly impregnated depth of 39 microns as compared to 103 and 132 microns for catalysts B and C, respectively.

Similar results may be observed with respect to the improved catalysts of our invention, catalysts D and E, FIGS. 3 and 4, respectively, as compared to catalysts A and F, FIGS. 2 and 5, respectively. These data present the results of realtime testing under the Simulated Federal Schedule described above over a 1,000 hour period at a speed of 50.5 mph.

With respect to catalyst D of our invention, it should be noted that whereas the macroporous volume is at the bottom end of the range specified in accordance with our invention, 0.025 cm$^3$/g., the macroporous radius is quite large, in excess of 187,000 A°, this balance being a viable combination. In accordance with our invention, a catalyst support having a macroradius greater than about 10,000 A°, preferably of from about 15,000 to 25,000 A° will meet most diffusivity and conversion requirements when combined with a macrovolume of at least about 0.020 and preferably as high as attainable up to the value at which the catalyst is not able to sustain the load and vibration forces to which it is subjected in the converter, e.g., without crushing, and having a surface area of at least 100 m$^2$/g. up to about 250 m$^2$/g., preferably about 110 to 150 m$^2$/g. The depth of penetration of the catalyst support by the catalytically active metallic material should be from at least 90 microns to about 250 microns, a range of from 100 to 245 being preferred to achieve the 50,000 mile lifetime of the catalyst.

Applicants' assignee has established a crush number

TABLE I

| Catalyst | Commercial A | B | C | D | E | Commercial F | G | H |
|---|---|---|---|---|---|---|---|---|
| surface area (m$^2$/g.) | 94 | 131 | 130 | 125 | 118 | 125 | 119 | 119 |
| pellet density (g/cm$^3$) | 1.132 | 1.052 | 1.052 | 1.159 | 0.970 | 1.103 | 0.910 | 0.760 |
| macroradius* (A°) | 6,270 | 10,872 | 10,872 | ~187,000 | 20,325 | (monomodal) 104 | 93,300 | 37,593 |
| microradius* (A°) | 90 | 73 | 73 | 94 | 95 | | 145 | 192 |
| macrovolume (cm$^3$/g) | 0.140 | 0.170 | 0.170 | 0.025 | 0.179 | | 0.260 | 0.440 |
| microvolume (cm$^3$/g) | 0.461 | 0.497 | 0.497 | 0.0579 | 0.569 | | 0.553 | 0.590 |
| solid density (g/cm$^3$) | 3.54 | 3.53 | 3.53 | 3.38 | 3.53 | 3.43 | 3.50 | 3.50 |
| impregnated depth (microns) | 39 | 103 | 132 | 227 | 152 | 36 | 100 | 137** |
| Pt - weight % | 0.035 | 0.043 | 0.060 | 0.033 | 0.046 | 0.037 | 0.1130 | 0.117 |
| Pd - weight % | 0.014 | 0.019 | — | 0.014 | 0.0200 | 0.015 | 0.0499 | 0.053 |
| pellet shape | spherical | spherical | spherical | spherical | spherical | cylindrical | spherical | spherical |
| pore volume (cm$^3$/g) (total porosity) | 0.601 | 0.667 | 0.667 | 0.604 | 0.748 | (monomodal) 0.615 | 0.813 | 1.03 |
| crush number (fresh-lbs.) | 16.4 | 14 | 14 | 16 | 11.5 | | 11.9 | 9 |

*integral averaged value
**average value

In FIG. 1 are plotted the results of accelerated durability testing on catalysts A, B and C and it can be seen that the commercial type catalyst hydrocarbon conversion felloff rapidly after about 30 hours under this rigorous test whereas catalysts B and C had not yet reached the point where the poison layer front passed the catalyst material zone after 35 hours of testing. It is also to described above, of 7 as the lower limit for its commercially used catalysts, this being based on the fact that the load on the pellets in the converter by reason of maximum weight of catalyst is about 6 pounds. However, it should be noted that lower density (higher macrovolume) supports will have a correspondingly lower weight in a converter and accordingly a lower crush number is appropriate for such materials. Crush numbers substantially lower than those listed in TABLE I would be acceptable as long as the catalyst is able to sustain the forces in the converter.

As can be seen in TABLE I, catalysts of our invention, G and H, have substantially higher macrovolumes, 0.26 and 0.45 cm$^3$g., respectively, and substantially lower density than the other catalysts listed. The crush numbers for catalysts G and H are also lower as might be expected in view of the lower density, 11.9 and 9, respectively. As noted above, the greater macrovolume results in greater diffusivity of exhaust gases in the catalyst with the increased surface area acting to trap the catalyst poisons for a resultant higher catalyst activity. Also as described above, the increased depth of catalyst penetration assures desired catalyst performance over the necessary lifespan of the catalyst.

From the standpoint of performance, TABLE II shows the results of steady state testing on an engine dynamometer, the results indicating improved performance as disclosed herein.

TABLE II

| Catalyst | G | | H | |
|---|---|---|---|---|
| | HC | CO | HC | CO |
| 600 second efficiency (%) | 96.8 | 99.5 | 97.5 | 99.4 |
| 205 second breakthrough (%) | 20 | 12 | 20 | 12 |
| seconds to 50% efficiency (light-off) | 24 | 19 | 26 | 21 |
| EPA predicted efficiency (%) | 91.5 | 82.6 | 91.9 | 82.6 |

In carrying out our invention, the porous refractory support may be selected from the well known refractory ceramic materials such as alumina (including its forms in various states of hydration, i.e., $\gamma$ alumina, bayerite, gibbsite, boehmite), cordierite, mullite, silica, zirconia and mixtures of such refractory metal oxides. The pellet catalyst may be formed in various shapes such as spherical or ball, extrudate forms as cylindrical and hollow cylinders, granules, rings and the like. The preferred forms are those of spheres formed by well known methods such as by a rotating disc, and a solid cylinder formed by extrusion. The sphere radius in the catalyst samples was about 0.159 cm. The cylinder dimensions were about 0.318 cm. in height and diameter.

While we have described our invention in terms using platinum and platinum/palladium it should be understood that other catalytically active metallic materials such as those of copper, manganase and zinc and Groups V-B, VI-B and VIII of the Periodic Table may be used, e.g., nickel, iron, chromium, cobalt, ruthenium and rhodium, and mixtures thereof, it being known that specific catalytic activity varies between materials in a given operating environment.

Control over the pore size and pore volume may be obtained by adding a combustible organic material to the support material when the support composition is being formed. By controlling the size and quantity of such combustible organic materials, the desired pore characteristics and surface area are obtained on firing of the support. Surface area is also affected by temperature and time of final calcining. Also, the desired depth of penetration by the catalytically active material may be obtained by treating the fired catalyst support with a dilute acid wash to obtain a controlled surface etch of the desired depth by dissolving free Na$_2$O. By way of example, the following is a description of a technique used successfully by the assignee of this invention in obtaining catalyst support having the desired characteristics described herein.

In forming the catalyst "B", an alumina trihydrate commercially available as the Bayer Process product, e.g., bayerite, and gibbsite, is ground to an average particle size of 10 microns, 90% in the 5 – 15 micron range. This alumina trihydrate contains from about 0.15 to about 0.5% by weight Na$_2$O, necessary to enable control of the penetration depth of catalytically active material.

The ground material is then flash calcined to form amorphous alumina exiting the calciner at a temperature of from about 450°–550° F. The calcined alumina was disc balled to form spheres having an average radius of 0.159 cm. on final firing. The spraying slurry was also provided with saran microballoons, plastic hollow spheres of from about 8 – 30 microns diameter, about 20 microns average diameter used in this instance, available commercially from Dow Chemical Co. The amount of said microballoons may be from about 0.25 to 0.5% by weight of the balled alumina, 0.5% being used in this instance. The amount of water used in the balling process should be such as to provide sufficient for full absorption in and saturation of the product, in this instance, an amount which is about 40% of the product weight.

The balled alumina is then stored in a moisture tight container to allow rehydration to the monohydrate, boehmite, form whereupon it is soaked in 180° – 200° F. water for 5 to 10 minutes to assure complete rehydration. Excess water is then drained, the product dried, i.e., at about 225° – 400° F., and then calcined at a temperature of about 1700° F. where it is held for from $\frac{1}{2}$ to 1 hour to develop the desired surface area, e.g., about 130 m$^2$/g., and the desired pore structure, the microballoons being readily burned out.

The calcined alumina is treated by soaking in a dilute acid to remove free Na$_2$O (unbonded in the alumina lattice) and thus assure the desired depth of penetration of the catalytically active platinum/palladium, and help achieve the desired surface area. The penetration depth was found to be proportional to the increase in acid concentration which may be from about 0.03 to 0.15 weight % acid, the time varying from about 1 to 5 minutes. In this instance, the alumina was soaked in a dilute hydrochloric acid solution, 0.05% by weight HCl, for a 1 minute period, excess solution being separated and the product dried at about 400° F. for about 1 hour. The resulting support pellets are then sprayed with a catalyst solution of chloroplatinic acid and palladium chloride, or any mixture of any of the possible soluble salts well known in the art, such as to result in a catalyst having a ratio of Pt:Pd = 5:2 and a total metal content in a 260 cu. in. converter of 0.05 troy oz. The resultant catalyst is air dried at a temperature of about 600° – 700° F.

From the foregoing description it can be seen that applicants have provided an improved pellet catalyst having a pore structure, surface area and depth of penetration of catalytic material such as to enable the required catalyst lifetime at conversion rates meeting regulatory requirements. Applicants' invention is described in terms represented by the specifics of the foregoing disclosure and is intended to cover obvious modifications as come within the scope of the claims which follow.

What is claimed is:

1. A noble metal pellet-type oxidation catalyst comprising a porous alumina support member having a surface area of at least 100 m²/g. up to about 250 m²/g., a pore structure characterized by a macropore volume of at least 0.020 cm³/g. up to the value at which the catalyst is not able to sustain the load and vibration forces in the converter and a macropore radius greater than about 10,000 A°, and a catalyst material selected from the group consisting of platinum and platinum/palladium deposited on said support to a depth of at least 90 microns up to about 250 microns, said pore structure serving to increase the diffusivity of the reactants into the interior of the catalyst, the surface area serving to compensate for the otherwise accelerated rate of poisoning caused by the increase in diffusivity, and the depth of deposit being such that the catalyst poisons do not break through the zone of deposit prior to the desired lifetime of the catalyst.

2. A catalyst as in claim 1 wherein the surface area is from about 110 to 150 m²/g., the macrovolume from about 0.025 to 0.45 cm³/g., and the depth of penetration of said catalyst material is from about 100 to 245 microns.

3. A catalyst as in claim 2 wherein the surface area is about 131 m²/g., the macrovolume about 0.170 cm³/g., and the depth of penetration about 103 microns.

4. A catalyst as in claim 2 wherein the surface area is about 125 m²/g., the macrovolume about 0.025 cm³/g., and the depth of penetration about 227 microns.

5. A catalyst as in claim 2 wherein the surface area is about 118 m²/g., the macrovolume about 0.179 cm³/g., and the depth of penetration about 152 microns.

6. A catalyst as in claim 2 wherein the surface area is about 119 m²/g., the macrovolume about 0.260 cm³/g., and the depth of penetration about 100 microns.

7. A catalyst as in claim 6 wherein the macrovolume is about 0.440 cm³/g., and the depth of penetration about 137 microns.

* * * * *